United States Patent
Arendt et al.

(10) Patent No.: US 9,181,098 B2
(45) Date of Patent: Nov. 10, 2015

(54) PREPARATION OF ARRAY OF LONG CARBON NANOTUBES AND FIBERS THEREFROM

(75) Inventors: Paul N. Arendt, Los Alamos, NM (US); Ramond F. DePaula, Santa Fe, NM (US); Yuntian T. Zhu, Cary, NC (US); Igor O. Usov, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 2068 days.

(21) Appl. No.: 12/002,087

(22) Filed: Dec. 13, 2007

(65) Prior Publication Data

US 2008/0181839 A1 Jul. 31, 2008

Related U.S. Application Data

(60) Provisional application No. 60/875,596, filed on Dec. 15, 2006.

(51) Int. Cl.
  *D01F 9/127* (2006.01)
  *C01B 31/02* (2006.01)
  *B82Y 30/00* (2011.01)
  *B82Y 40/00* (2011.01)

(52) U.S. Cl.
  CPC ............ *C01B 31/0233* (2013.01); *B82Y 30/00* (2013.01); *B82Y 40/00* (2013.01); *D01F 9/127* (2013.01); *C01B 2202/08* (2013.01)

(58) Field of Classification Search
  USPC ......... 423/447.1, 447.2, 447.3; 977/842–848, 977/742–753
  See application file for complete search history.

(56) References Cited

U.S. PATENT DOCUMENTS

| | | | |
|---|---|---|---|
| 6,448,701 B1 | 9/2002 | Hsu et al. | |
| 6,682,677 B2 | 1/2004 | Lobovsky et al. | |
| 2002/0168525 A1* | 11/2002 | Han et al. | 428/408 |
| 2003/0013280 A1 | 1/2003 | Yamanaka et al. | |
| 2004/0175631 A1 | 9/2004 | Crocker et al. | |
| 2004/0197909 A1 | 10/2004 | McKnight et al. | |
| 2005/0170089 A1* | 8/2005 | Lashmore et al. | 427/248.1 |
| 2005/0215049 A1 | 9/2005 | Horibe et al. | |
| 2005/0249656 A1 | 11/2005 | Smalley et al. | |

(Continued)

OTHER PUBLICATIONS

Nikolaev, et al., Gas-phase catalytic growth of single-walled carbon nanotubes from carbon monoxide, Chemical Physics Letters 1999; 313: 91-97.*

(Continued)

*Primary Examiner* — Daniel C McCracken
(74) *Attorney, Agent, or Firm* — Baker & Hostetler, LLP (57) ABSTRACT

An array of carbon nanotubes is prepared by exposing a catalyst structure to a carbon nanotube precursor. Embodiment catalyst structures include one or more trenches, channels, or a combination of trenches and channels. A system for preparing the array includes a heated surface for heating the catalyst structure and a cooling portion that cools gas above the catalyst structure. The system heats the catalyst structure so that the interaction between the precursor and the catalyst structure results in the formation of an array of carbon nanotubes on the catalyst structure, and cools the gas near the catalyst structure and also cools any carbon nanotubes that form on the catalyst structure to prevent or at least minimize the formation of amorphous carbon. Arrays thus formed may be used for spinning fibers of carbon nanotubes.

16 Claims, 10 Drawing Sheets

(56) References Cited

U.S. PATENT DOCUMENTS

2006/0246438 A1    11/2006    McCall et al.
2008/0018012 A1*    1/2008    Lemaire et al. .................. 264/82

OTHER PUBLICATIONS

Hata, et al., Water-Assisted Highly Efficient Synthesis of Impurity-Free Single-Walled Carbon Nanotubes, Science 2004; 306: 1362-1364.*
Zhang, et al., Multifunctional Carbon Nanotube Yarns by Downsizing an Ancient Technology, Science 2004; 306: 1358-1361.*
Definition of "cooling," accessed online at: http://www.merriam-webster.com/dictionary/cooling on Jun. 22, 2012.*
Definition of "cool," accessed online at: http://www.merriam-webster.com/dictionary/cool on Jun. 22, 2012.*
J. M. Smith, H. C. Van Ness and M. M. Abbott, Introduction to Chemical Engineering Thermdynamics, pp. 150-151 (5th ed. McGraw-Hill 1996).*
Definition of "structure," accessed online at http://www.merriam-webster.com/dictionary/structure on Mar. 10, 2013.*
Haggenmueller et al., "Aligned Single-Wall Carbon Nanotubes in Composites by Melt Processing Methods," Chemical Physics Letters, vol. 330, Nov. 2000, pp. 219-225.
Zhang et al., "Rapid Growth of Well-Aligned Carbon Nanotube Arrays," Chemical Physics Letters, vol. 362, Aug. 2002, pp. 285-290.
Jiang et al., "Spinning Continuous Carbon Nanotube Yarns," Nature, vol. 419, Oct. 2002, p. 801.
Cadek et al., "Morphological and Mechanical Properties of Carbon-Nanotube-Reinforced Semicrystalline and Amorphous Polymer Composites," Applied Physics Letters, vol. 81, Dec. 2002, pp. 5123-5125.
Demczyk et al., "Direct Mechanical Measurement of the Tensile Strength and Elastic Modulus of Multiwalled Carbon Nanotubes," Materials Science and Engineering, A334, Sep. 2002, pp. 173-178.
Maruyama et al., "Low-Temperature Synthesis of High-Purity Single-Walled Carbon Nanotubes from Alcohol," Chemical Physics Letters, vol. 360, Jul. 2002, pp. 229-234.
Safadi et al., "Multiwalled Carbon Nanotube Polymer Composites: Synthesis and Characterization of Thin Films," Journal of Applied Polymer Science, vol. 84, Jun. 2002, pp. 2660-2669.
Liao et al., "Effect of Catalyst Composition on Carbon Nanotube Growth," Appl. Phys. Lett., vol. 82, Apr. 2003, pp. 2694.
Dalton et al., "Super-Tough Carbon-Nanotube Fibers," Nature, vol. 423, Jun. 2003, p. 703.
Coleman et al., "Improving the Mechanical Properties of Single-Walled Carbon Nanotube Sheets by Intercalation of Polymeric Adhesives," Applied Physics Letters, vol. 82, Mar. 2003, pp. 1682-1684.
Penumadu et al., "Mechanical Properties of Blended Single-Wall Carbon Nanotube Composites," Materials Research Society, vol. 18, Aug. 2003, pp. 1849-1853.
Li et al., "Direct Spinning of Carbon Nanotube Fibers from Chemical Vapor Deposition Synthesis," Science, vol. 304, Apr. 2004, pp. 276-278.
Ericson et al., Macroscopic, Neat, Single-Walled Carbon Nanotube Fibers, Science, vol. 305, Sep. 2004, pp. 1447-1450.
Hata et al., "Water-Assisted Highly Efficient Synthesis of Impurity-Free Single-Walled Carbon Nanotubes," Science, vol. 306, Nov. 2004, pp. 1362-1364.
Zheng et al., "Ultralong Single-Wall Carbon Nanotubes," Nature Materials, vol. 3, Oct. 2004, pp. 673-676.
Zhang et al., "Multifunctional Carbon Nanotube Yarns by Downsizing an Ancient Technology," Science, vol. 306, Nov. 2004 pp. 1358-1361.

* cited by examiner

PREPARATION OF ARRAY OF LONG CARBON NANOTUBES AND FIBERS THEREFROM

RELATED APPLICATIONS

This application claims the benefit of U.S. Provisional Patent Application Ser. No. 60/875,596, filed Dec. 15, 2006, incorporated by reference herein.

STATEMENT REGARDING FEDERAL RIGHTS

This invention was made with government support under Contract No. DE-AC52-06NA25396 awarded by the U.S. Department of Energy awarded by the U.S. Department of Energy. The government has certain rights in the invention.

FIELD OF THE INVENTION

The invention generally relates to the preparation of an array of carbon nanotubes, and to the preparation of fibers from the array.

BACKGROUND

Individual carbon nanotubes (CNTs) are at least one order of magnitude stronger than any other known material. CNTs with perfect atomic structures have a theoretical strength of about 300 GPa. In practice carbon nanotubes do not have perfect structures. However, CNTs that have been prepared have a measured strength of up to about 150 GPa, and the strength may improve upon annealing. For comparison, Kevlar fibers currently used in bullet-proof vests have a strength of only about 3 GPa, and carbon fibers used for making space shuttles and other aerospace structures have strengths of only about 2-5 GPa.

CNTs prepared according to present methods are far too short to make effective use of their strength and/or cannot be prepared in sufficiently large quantities.

CNT fibers can be drawn from CNT-polymer solutions or directly from CNT arrays. However, due to practical difficulties in dispersing, assembling and aligning carbon nanotubes using a CNT-polymer route, a strategy based on direct spinning of fibers from CNT arrays is more attractive.

The spinnability of CNT arrays depends greatly on the quality of the arrays, including CNT alignment, density, purity, length, and other factors. CNT arrays of the prior art are generally not good precursors for fibers because they tend to be contaminated with amorphous carbon. Too much amorphous carbon tends to affect the spinnability of the CNT arrays in a deleterious manner.

SUMMARY OF THE INVENTION

In accordance with the purposes of the present invention, as embodied and broadly described herein, the present invention is concerned with a system for preparing an array of carbon nanotubes. The system includes a catalyst structure that includes a substrate having a first side and a second side, a buffer layer on the first side of said catalyst structure, and a catalyst on the buffer layer. The system also includes a surface portion in contact with the catalyst structure for heating the catalyst structure, and a cooling portion for cooling gas above the catalyst structure and for cooling nanotubes that form on the catalyst structure.

The invention is also concerned with a method for preparing an array of carbon nanotubes. The method includes heating a catalyst structure while cooling the gas above the catalyst structure, and exposing the heated catalyst structure to a carbon nanotube precursor.

The invention is also concerned with a supported array of carbon nanotubes. The supported array is prepared by a method that includes heating a catalyst structure while cooling the gas above the catalyst structure, and exposing the heated catalyst structure to a carbon nanotube precursor.

The invention is also concerned with a method for preparing a fiber. The method includes heating a catalyst structure while cooling the gas above the catalyst structure, exposing the heated catalyst structure to a carbon nanotube precursor, thereby forming an array of carbon nanotubes on the catalyst structure, and spinning a fiber from the array of carbon nanotubes.

The invention is also concerned with a fiber prepared by a method that includes heating a catalyst structure while cooling the gas above the catalyst structure, exposing the heated catalyst structure to a carbon nanotube precursor; thereby forming an array of carbon nanotubes, and spinning a fiber from the array of carbon nanotubes.

The invention is also concerned with a catalyst structure. The catalyst structure includes a substrate having a first side, a second side, and trenches in the first side. The catalyst structure also includes a buffer layer on the first side of the substrate and a catalyst on the buffer layer. The buffer layer and catalyst are substantially excluded from the trenches in the substrate.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2a shows a schematic illustration of an embodiment catalyst structure with trenches, while

DETAILED DESCRIPTION

The invention is concerned with the preparation of arrays of long carbon nanotubes (CNTs). According to the present invention, arrays of long (greater than 0.5 millimeters) CNTs are synthesized using a catalyst structure and a carbon source under conditions where carbon from the carbon source decomposes to form carbon nanotubes. The invention is also concerned with a system for growing an array of carbon nanotubes with minimal formation of amorphous carbon on the array. The invention is also concerned with fibers that are spun from the array.

Figure 1A:
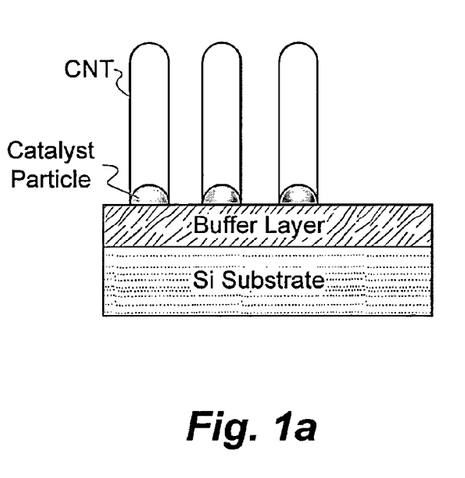
FIG. 1a shows a schematic representation of base growth of carbon nanotubes (CNTS) on a catalyst structure.
Figure 1B:
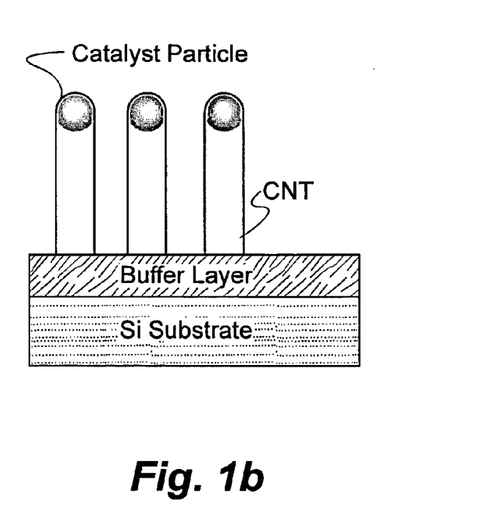
FIG. 1b shows a schematic representation of tip growth of CNTs on a catalyst structure.

Catalyst structures typically include a substrate, a buffer layer, and a catalyst layer on the buffer layer. The CNTs can grow by a base growth mechanism where the catalyst remains on the buffer layer, as shown in FIG. 1a, or by a mechanism where a catalyst particle initiates growth and moves with the growing nanotube, as shown in FIG. 1b. When the buffer layer is $Al_2O_3$ or $SiO_2$, for example, CNTs tend to grow by the base growth mechanism, where a carbon-containing precursor diffuses through the growing nanotube array to the catalyst so that it may react with the catalyst for nanotube growth. Diffusion is a slow process and becomes even slower as the nanotube array grows taller and as amorphous carbon forms on and within the array.

An aspect of the invention is concerned with overcoming the diffusion problem when the CNTs of a CNT array grow by a base growth mechanism. The problem relates to supplying a carbon source (hydrocarbon gas, for example) to the catalyst after a somewhat long CNT array has formed. As the array grows, it becomes more difficult for gas to diffuse to the catalyst portion of a catalyst structure. When this happens, growth slows down, but the temperature of the CNT array remains high, and the array itself will tend to react with carbon-containing precursor (gaseous hydrocarbon, for example) and form amorphous carbon and/or undesirable carbon species on and within the array. The diffusion problem is believed to be a factor that limits the growth of CNT arrays. To overcome the diffusion problem, a catalyst structure with trenches along the catalyst structure, channels through the catalyst structure, or a combination of trenches and channels may be used. In addition, a system may be used that provides heat to a catalyst structure and at the same time removes heat from a volume above the catalyst structure so that the CNT array that forms is less likely to react with the carbon-containing precursor and form amorphous carbon.

Figure 2A:
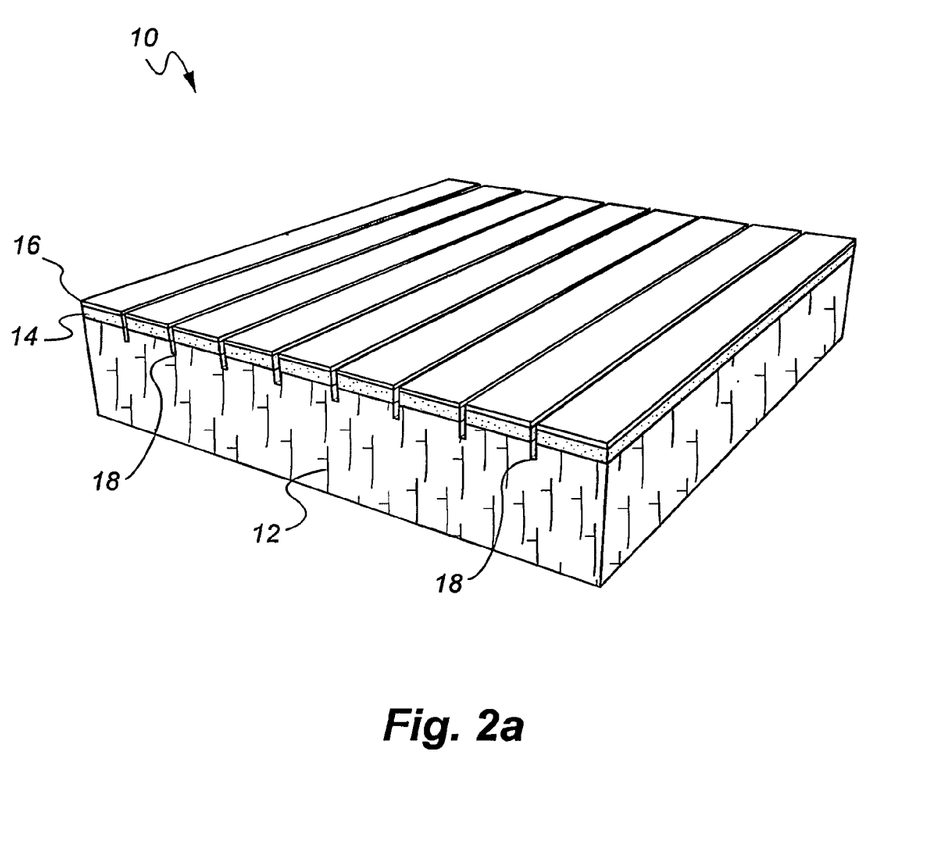
Figure 2B:
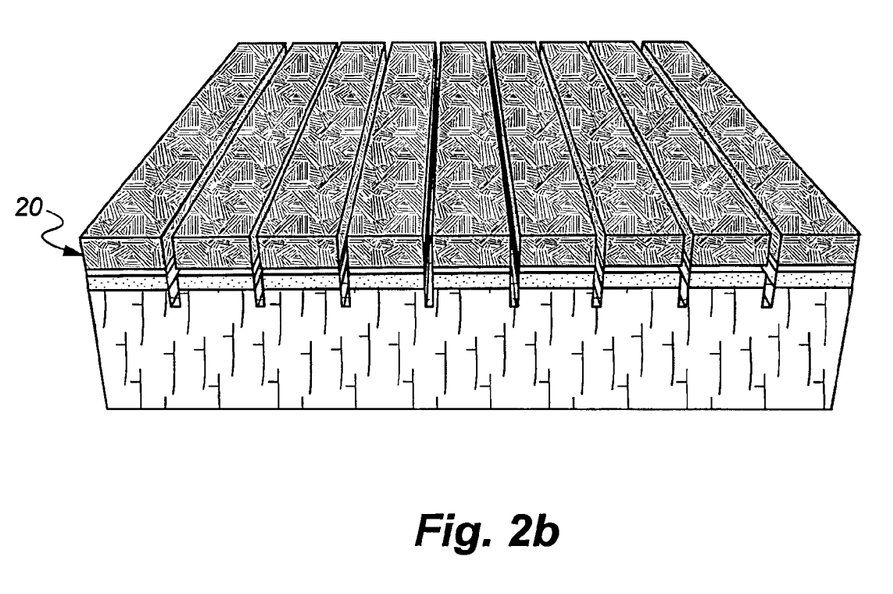
FIG. 2b shows a schematic illustration of the catalyst structure with array of CNTs.
Figure 2C:
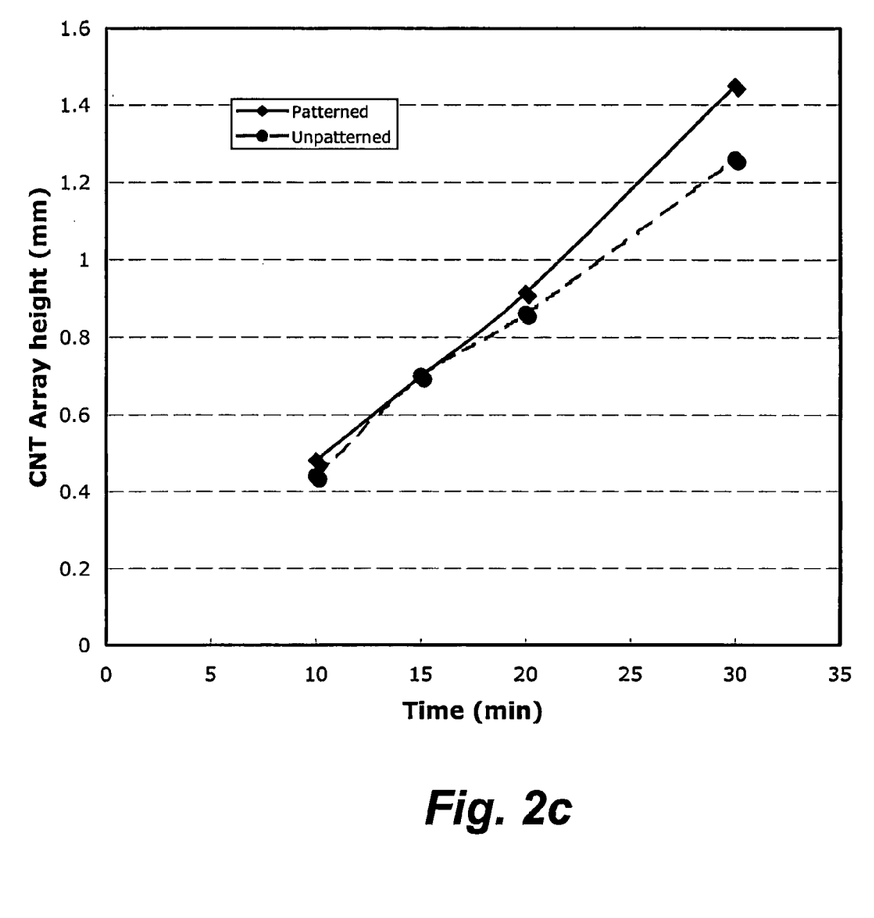
FIG. 2c shows a graph of CNT array height in millimeters versus time in minutes that compares growth of an array on a catalyst structure with trenches (patterned, solid line) with growth on a substrate without trenches (unpatterned, dashed line).

FIG. 2a is a schematic illustration of an embodiment catalyst structure, and FIG. 2b shows a schematic illustration of the catalyst structure with array of CNTs. As FIGS. 2a-b shows, catalyst structure 10 includes substrate 12, buffer layer 14 on substrate 12, and catalyst layer 16 on the buffer. In this embodiment, the substrate includes trenches 18. The aspect ratio (i.e., the ratio of height to width) of trenches 18 is large enough that catalyst and buffer layer material will not be deposited in the trenches, and CNT arrays will not grow from the trenches. The trenches provide efficient diffusion paths that permit a downward flow of a carbon nanotube precursor (a mixture of inert gas and carbon-containing gas, for example) around a growing CNT array 20 (see FIG. 2b) to the surface where the catalyst material is located. Thus, carbon-containing precursor diffuses down and between rows of CNTs toward and through the trenches and, from there, to catalyst material on the buffer layer. FIG. 2c shows a graph of CNT array height in millimeters versus time in minutes that compares growth of an array on a catalyst structure with trenches (patterned, solid line) with growth on a substrate without trenches (unpatterned, dashed line). As FIG. 2c shows, the array grown on the catalyst structure with trenches is bigger than the one grown on the catalyst structure absent the trenches. Both catalyst structures have a silicon substrate, a 250-nanometer ("nm") thick layer of alumina ($Al_2O_3$) on the substrate, and an 8-nm thick layer of iron (Fe) on the alumina layer. The trenches on the patterned catalyst structure are two thousandths of an inch wide by ten thousandths of an inch deep and are separated by a distance of 2 millimeters ("mm").

The trenches may be distributed in any manner about the substrate. In some embodiments, the trenches are uniformly distributed in the substrate. The trenches may be created before a buffer layer is deposited on the substrate. In some embodiments, the trenches are about 1-100 micrometers (μm) in width, approximately 1-10 times deeper than their width and about 0.1-1 millimeter (mm) apart. It should be understood, however, that other trench sizes and spacings will also work and that the invention should not be limited to these exact measurements. Substrates with such trenches are easily fabricated by laser machining, chemical etching through a photolithographic mask, or by any other suitable method.

In some embodiments, a catalyst structure with trenches may be prepared by (i) depositing a buffer layer on a Si substrate having trenches, (ii) depositing a catalyst layer on the buffer layer, and (iii) and forming catalyst particles from the catalyst layer on the buffer layer. The resulting catalyst structure is exposed to a carbon-containing precursor under conditions that result in the production of an array of long CNTs on the catalyst structure.

Figure 3:
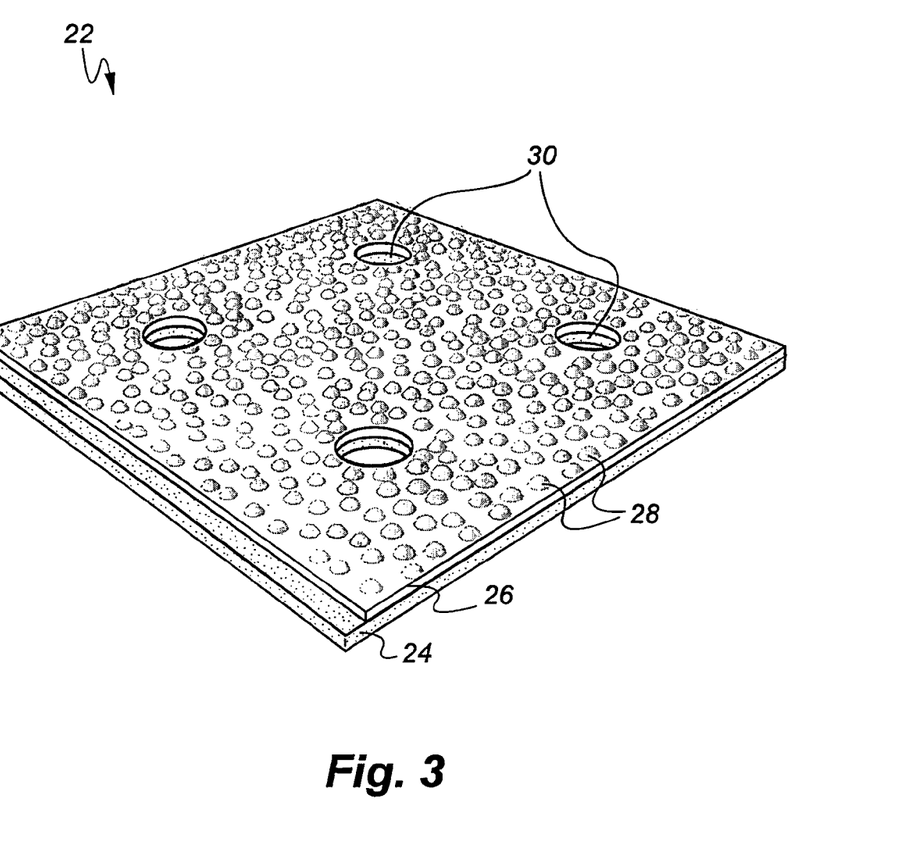
FIG. 3 shows a schematic illustration of an embodiment catalyst structure that includes a substrate, a buffer layer on the substrate, and a catalyst layer on the buffer layer, and channels through the catalyst structure.

In other embodiments, a catalyst structure is prepared by (i) depositing a buffer layer on a Si substrate having channels through the substrate from one side to another, (ii) depositing a catalyst layer on the buffer layer, and (iii) and forming catalyst particles from the catalyst layer on the buffer layer. The resulting catalyst structure is exposed to a carbon source under conditions that result in the production of an array of long CNTs on the catalyst structure. FIG. 3 is a schematic illustration of an embodiment catalyst structure 22 that includes substrate 24, buffer layer 26 on substrate 24, catalyst particles 28 on buffer layer 26, and channels 30 through catalyst structure 22. Channels 30 provide efficient diffusion paths that permit the flow of a carbon-containing precursor through catalyst structure 22 to the catalyst layer 28.

Figure 4:
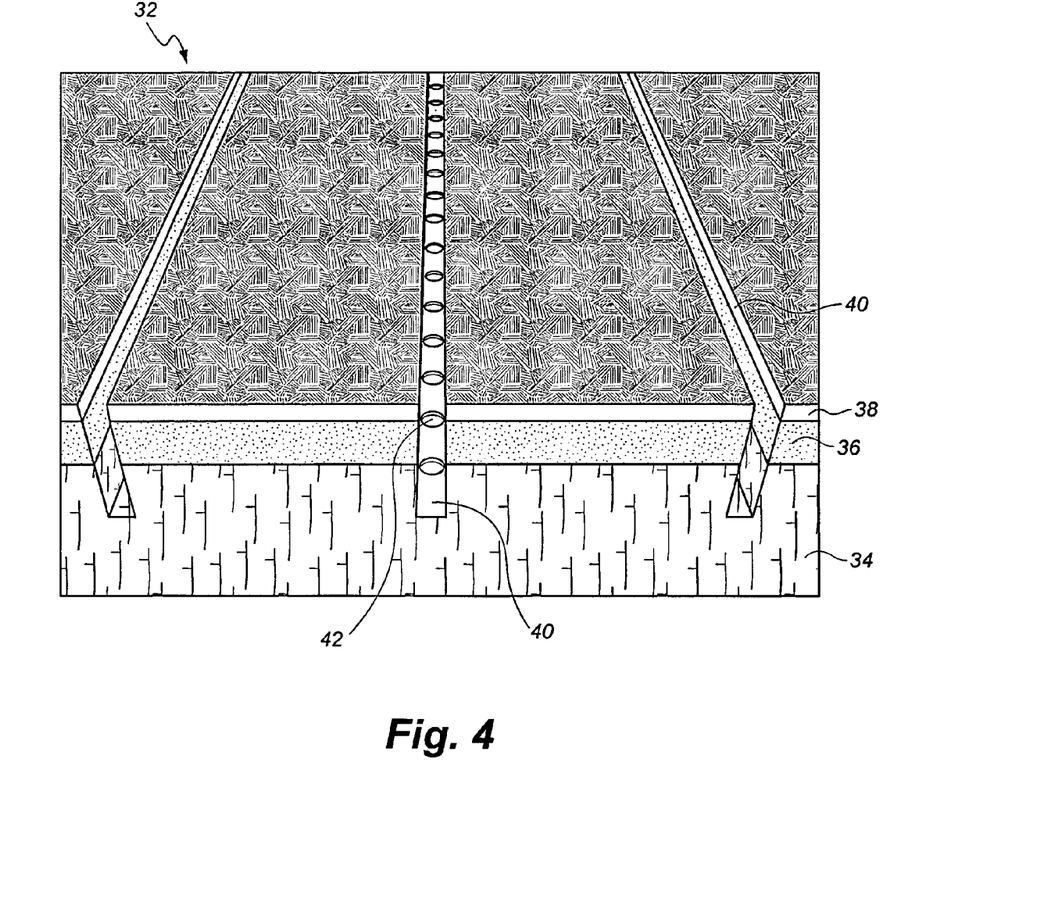
FIG. 4 shows a schematic illustration of a portion of an embodiment catalyst structure with trenches and channels.

In some embodiments, a catalyst structure is prepared by (i) depositing a buffer layer on a Si substrate having both trenches and channels, (ii) depositing a catalyst layer on the buffer layer, and (iii) and forming catalyst particles from the catalyst layer on the buffer layer. FIG. 4 is a schematic illustration of a portion of an embodiment catalyst structure 32, which includes substrate 34, buffer layer 36 on substrate 34, catalyst layer 38 on buffer layer 34, trenches 40, and channels 42. The aspect ratio of the trenches is large enough that the catalyst and buffer layers will not be deposited within them and CNT arrays will not grow from the trenches. Catalyst structure 32 may be exposed to a carbon source under conditions that result in the production of an array of long CNTs on the catalyst structure.

The channels may be distributed along the trenches and through the substrate. The channels may be smaller, larger, or the same size as the width of the trenches. The channels may have a circular cross section, rectangular cross section, or any other type of cross section, so long as they penetrate the catalyst structure. In some embodiments, the channels are about 0.1-0.5 millimeters (mm) in diameter and about 0.5-4 mm apart so that carbon-containing precursor (hydrocarbon vapor, for example) can diffuse through the channels to the trenches and then along the trenches to the catalyst. It should be understood, however, that other trench and channel sizes and spacings will also work and that the invention should not be limited to these exact measurements. Substrates with such trenches are easily fabricated by laser machining, chemical etching through a photolithographic mask, or by any other suitable method.

In the embodiment shown in FIG. 4, trenches 40 and channels 42 are aligned and uniformly spaced apart. It should be understood that other embodiment catalyst structures may include both trenches and channels that are not aligned, not uniformly spaced apart, or both.

Figure 5:
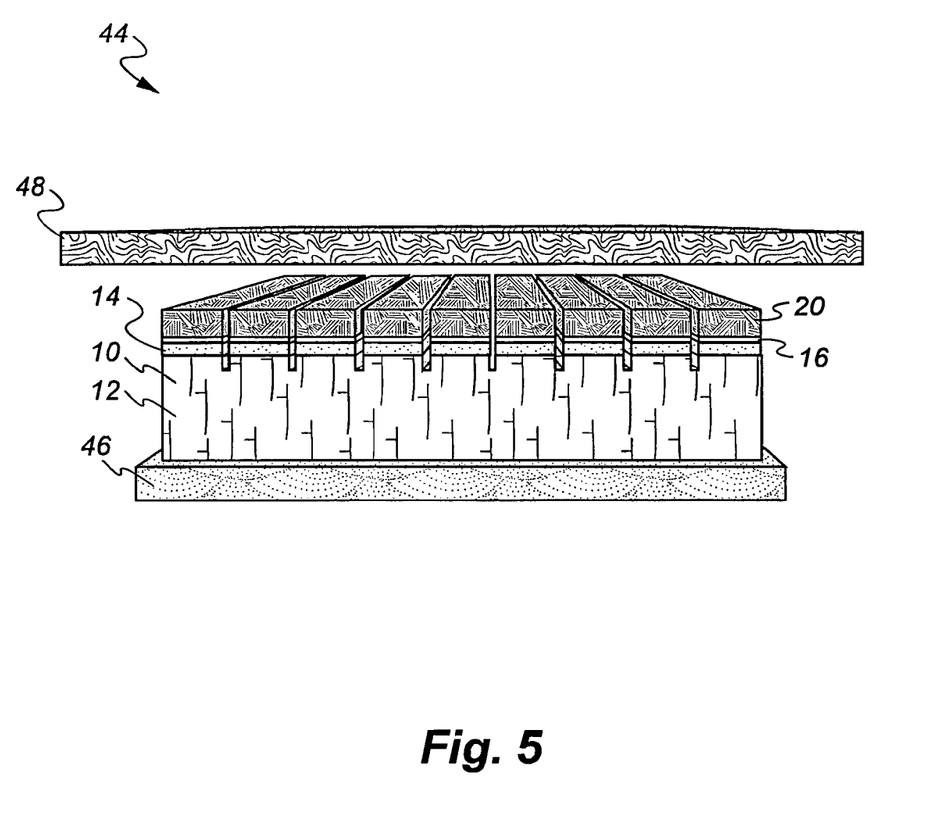
FIG. 5 shows a schematic representation of a an embodiment system for preparing an array of CNTs that includes a catalyst structure with trenches, a heater plate for heating the catalyst structure, and a cooling portion for cooling the gas near the catalyst.

A schematic representation of a portion of an embodiment system for preparing an array of CNTs is shown in FIG. 5. System 44 includes catalyst structure 10, heater plate 46, and cooling portion 48. Heater plate heats substrate portion 12 of catalyst structure 10 from the side opposite the catalyst layer 16. Cooling portion 48 cools a volume above catalyst structure 10 so that CNT array 20 is formed while minimizing the production of amorphous carbon on and within the array.

Figure 6:
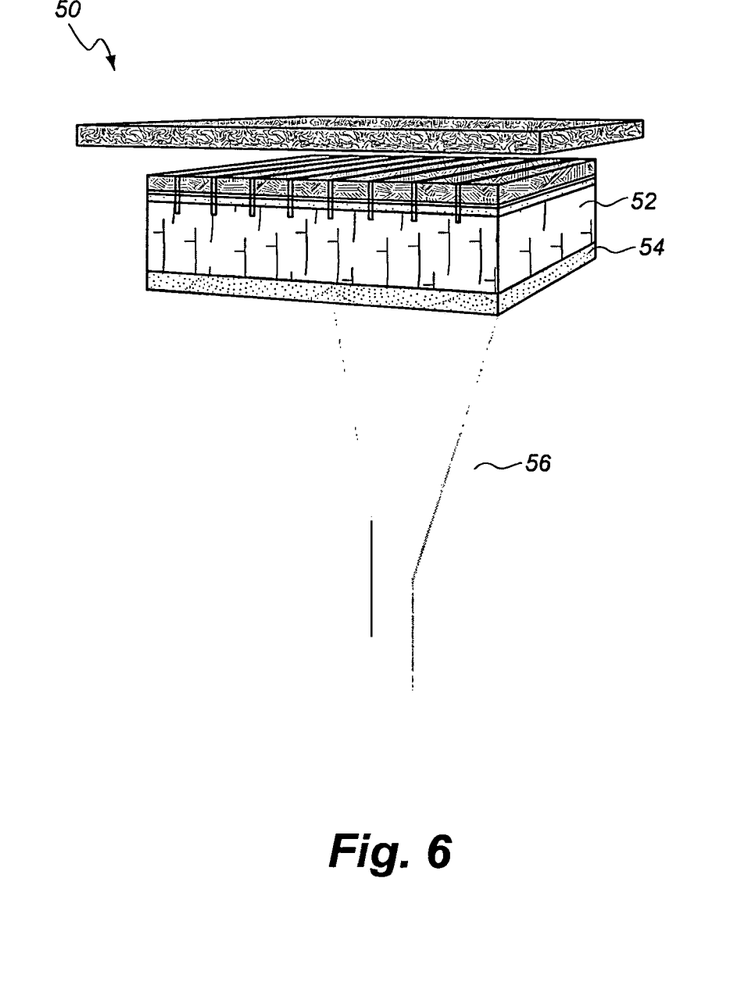
FIG. 6 shows a schematic representation of an embodiment system that includes a catalyst structure with trenches and channels, a heater plate for heating the catalyst structure, a cooling portion for cooling the gas near the catalyst structure, and a conduit for sending carbon-containing precursor through the channels in the substrate.

A schematic representation of another embodiment system is shown in FIG. 6. System 50 includes a catalyst structure 52 having both trenches and channels, and heater plate 54 in contact with the catalyst structure 52, and a gas delivery system 56 that sends carbon-containing precursor through openings in heater plate and then through channels in the catalyst structure.

Figure 7:
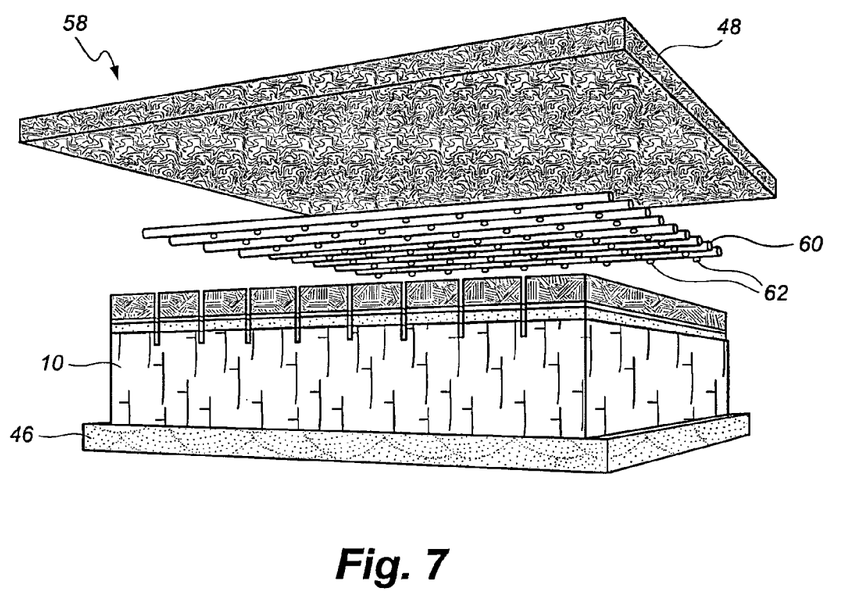
FIG. 7 shows a schematic representation of an embodiment system that includes an array with trenches, a heating plate for heating the catalyst structure, a cooling portion, and a delivery system in between the catalyst structure and the cooling portion. The delivery system includes showerheads for providing the carbon-containing precursor to the catalyst structure. The cooling portion cools the showerheads to prevent clogging, and also cools a volume near the catalyst to prevent or at least minimize the formation of amorphous carbon as the CNT array is prepared.

A schematic representation of another embodiment system is shown in FIG. 7. System 58 includes catalyst structure 10, heater plate 46, cooling portion 48, and delivery system 60, which includes showerheads 62 through which carbon-containing precursor exits and moves toward catalyst structure 10. Heater plate 46 heats catalyst structure 10 while cooling portion 48 cools the showerheads also cools a volume in between cooling portion 48 and catalyst structure 10 so that the array of CNTs that form are cooled to a temperature lower than the temperature of catalyst structure 10. The cooling of the CNT array as it forms on catalyst structure 10 minimizes the likelihood that the CNTs will break down the carbon-containing precursor to amorphous carbon, which prevents or at least minimizes the formation of undesirable amorphous carbon on the CNT array. Cooling the showerheads prevents or at least minimizes the likelihood that the showerheads break down the carbon-containing precursor, which would clog the showerheads.

It should be understood that embodiment systems of the invention may include catalyst structures with or without trenches, channels or a combination of channels and trenches. The effect of directly heating the substrate while cooling the gas nearby may be sufficient in some embodiments to reduce the formation of amorphous carbon by cooling the gas near the catalyst and also the carbon nanotubes that form on the catalyst structure so that the likelihood is reduced that carbon nanotubes themselves break down the carbon-containing precursor.

An embodiment catalyst structure useful for preparing a high purity, well-aligned array of multi-walled, long CNTs is prepared using a silicon substrate with trenches therein by depositing a layer of aluminum oxide on the substrate, and depositing iron on the aluminum oxide layer. The structure is heat treated to convert iron to particles of a size where each particle can initiate a carbon nanotube. Afterward, an array of long CNTs is prepared on the catalyst structure by exposing the catalyst structure to a gaseous mixture of carbon source such as ethylene and inert gas such as argon. In some embodiments, water vapor, oxygen, hydrogen, etc. may be added to the gaseous mixture.

A non-limiting list of buffer materials useful with embodiment catalyst structures of the invention includes aluminum oxide ($Al_2O_3$), magnesium oxide (MgO), zinc oxide (ZnO), silicon carbide (SiC), and the like.

A non-limiting list of catalysts useful with embodiment catalyst structures includes metals such as Fe, Co, Ni, mixtures of these metals, and alloys of these metals such as, but not limited to, Co—Mo alloy or Fe—Mo alloy.

In some embodiments, a catalyst structure may be prepared using a silicon substrate having a thin surface layer of silicon dioxide ($SiO_2$), and channels in the silicon support, as shown in FIG. 2a. In some embodiments, a layer of aluminum oxide ($Al_2O_3$) of a thickness of from about 2 nanometers (nm) to about 200 nm is deposited on the silicon dioxide by ion beam assisted deposition (IBAD). In an embodiment, a layer of aluminum oxide of a thickness of about 10 nm is deposited on the substrate by IBAD. The deposition is performed in a vacuum system with a base pressure of $5\times10^{-7}$ Torr. The deposition is done using ion-beam sputtering of an Al (99.99%) target bombarded with 950 eV $Ar^+$ ions. The oxygen partial pressure during the deposition is $5.7\times10^{-7}$ Torr and the deposition rate is 0.13 nm/s. During the deposition the alumina is irradiated with 200 eV $Ar^+$ with an ion current density of about 18 $mA/cm^2$ in order to increase the film density. The angle between the substrate normal and assisting ion beam direction is 45 degrees. In other embodiments, the layer of aluminum oxide may be prepared a different technique such as electron beam evaporation, chemical vapor deposition (CVD), or the like. The IBAD technique can deposit an $Al_2O_3$ layer that is fully, or at least partially amorphous.

After the IBAD deposition, a thin layer (of about 1-3 nm in thickness) of iron is magnetron sputter-deposited onto the aluminum oxide layer. The aluminum oxide layer may in some way improve catalytic activity and extend the lifetime of the catalyst.

An embodiment catalyst structure useful for preparing CNT arrays may include a 1 nm thick iron layer, a 10 nm thick aluminum oxide layer, and a 100 nm thick silicon dioxide layer on a silicon substrate having channels. In another embodiment, the iron layer is a layer of iron particles.

Some factors that may have an affect on the formation of catalyst particles include (i) the composition and thickness of the buffer layer, (ii) the composition and thickness of the catalyst layer, and (iii) the temperature at which the catalyst is heated to form catalyst particles from the layer. A possible explanation for the formation of catalyst particles is that they form during heating as a result of a reduction in interfacial and surface energy. The buffer material can affect the interfacial energy, which in turn can affect the size and shape of catalyst particles.

With regard to the thickness of the catalyst layer, a thicker layer tends to result in a structure with larger catalyst particles. Catalyst particles are less likely to form using a catalyst structure having too thin a catalyst layer.

The temperature used for converting a catalyst layer into catalyst particles is typically the same or higher than the temperature used for nanotube production. The catalyst particles that form after a heating procedure should be stable during the nanotube growth. The temperature for nanotube growth is largely determined by the carbon source and catalyst composition and size. These parameters tend to be interdependent.

In an embodiment, system 58 is used to prepare a CNT array by heating heater plate 46, which then heats catalyst structure 10. Cooling portion 48 cools delivery system 60 and the gas between cooling portion 48 and catalyst structure 10. As plate 46 heats up, a nonflammable gaseous mixture of argon and ethanol is sent through delivery system 60 and through showerheads 62 to catalyst structure 10.

Sometimes, water is included in the gaseous mixture by passing a small amount of Ar gas through a water bubbler. The addition of water vapor can also participate in minimizing the formation of amorphous carbon on the CNT array.

The growth rate for CNTs may be affected by factors such as (i) particle size(s) of catalyst, (ii) catalyst environment (temperature and/or pressure, for example), (iii) effective delivery of carbon-containing precursor to catalyst particles after the formation of a thick layer of nanotube array on the catalyst and substrate, (iv) the formation of amorphous carbon during the nanotube growth, and other factors.

The size of the catalyst particles may have an affect on the diameters of individual carbon nanotubes. In some embodiments, catalyst particles with diameters in the range of about 0.5 nanometer to about 30 nanometers are uniformly distributed on a substrate. A catalyst particle density is chosen that results in a nanotube array rather than randomly oriented nanotubes.

The invention may employ a wide range of carbon-containing precursors. Both gaseous and liquid precursors may be used. Alkanes hydrocarbons such as alkanes (methane, ethane, hexane, for example), alkenes (ethylene, for example), alkynes (acetylene, for example) and other sources may be used. Other carbon sources including, but not limited to, functionalized hydrocarbons (alcohols and ketones (acetone, ethanol, and the like) may be used. Also, a wide range of concentrations (from about 1 percent to about 100 percent of the carbon source and from about 1 percent to about 100 percent of an inert gas such as argon, helium, or an inert gas mixture) may be used. For the purposes of this invention, hydrocarbons also include functionalized hydrocarbons (acetone, ethanol, and the like). The percentage of a particular hydrocarbon used may depend to some extent on the hydrocarbon employed.

In an embodiment synthesis, an array of long CNTs is prepared on a structure having channels by placing a catalyst structure on a heater plate and adjusting the heater plate temperature to a temperature of about 750 degrees Celsius. The cooling portion temperature is adjusted to a temperature of 20 degrees Celsius and a mixture of forming gas (about 94 percent argon and about 6 percent hydrogen) and ethanol is sent through the delivery system.

In another embodiment synthesis, a catalyst structure is placed on a heater plate and the heater plate temperature is adjusted to a temperature of about 800 degrees Celsius. The cooling portion temperature is adjusted to a temperature of about 20 degrees Celsius, and a mixture of forming gas and ethanol is sent through the delivery system for a period of about 2 hours.

In another embodiment synthesis, a catalyst structure is placed on a heater plate and the heater plate temperature is adjusted to a temperature of about 780 degrees Celsius. The temperature of the cooling portion is adjusted to a temperature of about 20 degrees Celsius, and a mixture of forming gas, ethanol, and water vapor is sent through a delivery system through showerheads over the catalyst structure. The addition of water vapor to the gaseous mixture might not have any substantial effect during the first part of the growth of the array, but may play a role in maintaining the activity (i.e. the growth rate) and the lifetime of the catalyst by minimizing the formation of amorphous carbon that contaminates the array and deactivates the catalyst. In other embodiments, the gaseous mixture may include methanol or isopropanol.

When ethanol is used as a carbon-containing precursor, the processing temperature is in the range of from about 750 degrees Celsius to about 1000 degrees Celsius.

Certain aspects of the invention that have been described in some detail thus far have been concerned with catalyst structures, systems, and the preparation of CNT arrays. Another aspect of the invention is concerned with CNT fibers made from the arrays. CNT fibers may be spun from CNT arrays like thread may be spun from a silk cocoon. Arrays with good CNT alignment and high purity are favorable for spinning.

While not wishing to be bound by any particular explanation, it is currently believed that the longer it takes to grow a CNT array, the more amorphous carbon that is deposited on the CNT array if the array is maintained at a temperature substantially equivalent to that of the substrate. The presence of amorphous carbon on the array is detrimental for spinning fibers, and arrays with a substantial amount of amorphous carbon are unsuitable for spinning. A benefit of arrays prepared according to the present invention is that such arrays do not include, or include only a minimal amount of amorphous carbon. This is likely due to factors including, but not limited to: (i) the speed at which arrays may be grown using the invention, (ii) the presence of trenches and/or channels in some embodiments for increasing the diffusion of carbon-containing precursor to the catalyst, (iii) lowering the temperature of the carbon containing precursor and of the carbon nanotubes of the array. The CNT arrays synthesized herein enhance the strength of fibers spun from the arrays.

Figure 8:
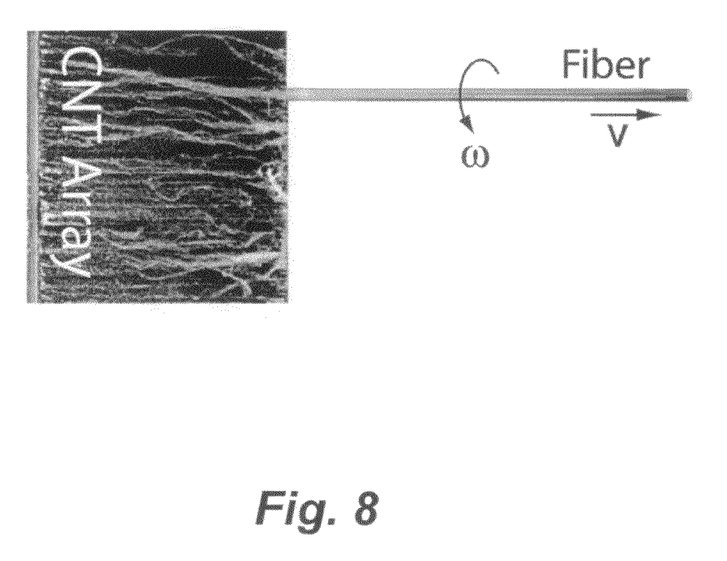
FIG. 8 shows a schematic diagram relating to spinning a fiber from an array of long CNTs.

FIG. 8 shows a schematic diagram relating to spinning a fiber is from an array of long CNTs. As FIG. 8 shows, the fiber spins at a rate of $\omega$ while being pulled at a speed of v. The spinning parameters $\omega$ and v likely have an effect on the microstructural characteristics (e.g. the fiber diameter, the helix angle of individual CNTs in the fiber, and the like) of the resulting CNT fiber. The spinning parameters can be adjusted to optimize the fiber structure for highest strength.

A spinning shaft with an end configured for nanotubes to stick on (a hooked end, an end with adhesive, and the like) may be used for preparing a fiber from the CNT array. When this end of the spinning shaft makes contact with nanotubes from the supported array, the nanotubes begin to twist around the shaft. Many thousands of nanotubes are likely twisted together at the beginning. A fiber begins to grow as the array moves relative to the spinning shaft, and additional nanotubes from the array can twist around the growing fiber to extend the length of the fiber.

The as-spun fiber can be stretched to improve alignment of the nanotubes.

Spinning a fiber from a supported array prepared according to embodiments of this invention produces a stronger fiber than one prepared from CNTs that are not aligned or from an arrays made by other methods because CNTs (i) are aligned, (ii) the CNTs tend to be longer in embodiment arrays than other arrays, and (iii) the CNTs are either not contaminated with amorphous carbon, or include only a minimal amount of amorphous carbon. The spinning process spirally aligns the nanotubes, and this spirally aligned arrangement provides the CNT (or CNT/polymer composite) fiber with high strength. These CNT, or CNT/composite fibers have a rope like structure that is made strong by twisting the carbon nanotubes together and around each other.

The nanotubes of the array may be coated with a polymer solution before they are spun into fibers or during the spinning process. The spinning process spirally aligns the polymer-coated nanotubes, and when the nanotubes are carbon nanotubes, the resulting fiber has a high volume fraction (60 percent of nanotubes, and higher), and the twisting improves mechanical interlocking between nanotubes.

CNT fibers spun from the array can also be infiltrated/coated with a polymer matrix to form composite fibers.

The spinning approach has several advantages compared to a drawing approach. A spinning process is simpler than a drawing approach. A spinning approach provides a fiber with a helical orientation of nanotubes that results from spinning the nanotubes and twisting them around each other. A helical orientation contributes to improving load transfer because the twisted nanotubes can squeeze radially against each other when the composite fiber is under load, which increases the bonding strength and consequently load-transfer efficiency. Untwisted carbon nanotubes/polymer composite fibers prepared by drawing are not strong fibers, presumably because the nanotube-polymer interface is slippery, making it difficult to transfer load onto the nanotubes. The twisting squeezes out excess polymer so that individual CNTs can be closely spaced together. This close spacing increases the CNT volume fraction of the composite fiber.

Composite fibers prepared using nanotube arrays of the invention may be used for a variety of applications. These fibers could be used to prepare laminates, woven textiles, and other structural fiber composite articles. Fiber composites of this invention could be used to prepare strong and light armor for aircraft, missiles, space stations, space shuttles, and other high strength articles. The reduced weight would allow aircraft and projectiles to fly faster and for longer distances while using less fuel. These features are also important for spacecraft for future space missions (to the moon and to Mars, for example), where high strength and lightweight features of the composite fibers are very important.

Usually a fraction of carbon nanotubes in a CNT array is metallic. Metallic carbon nanotubes have been shown to be highly electrically conductive. Thus, composite fibers prepared according to some embodiments of this invention would not only be very strong but also highly electrically conductive.

Composite fibers of this invention are prepared using a substantially parallel, aligned carbon nanotube array. In some embodiments of the invention, arrays prepared using a channeled substrate of the invention may be coated with a dilute solution of polymer by, for example, immersing the nanotube array in a polymer solution, and then ultrasonically vibrating the immersed array to promote wetting. Some non-limiting examples of polymer solutions that can be used to prepare carbon nanotube-polymer composites include polystyrene dissolved in toluene, low viscosity liquid epoxy, poly(methyl methacrylate) (PMMA) dissolved in PMF, polyvinyl alcohol (PVA) in water, and poly(vinyl pyrrolidone) (PVP) in water.

For polymer-coated nanotubes, after spinning and stretching, solvent is evaporated and the polymer is cured at an appropriate temperature. Detailed treatment parameters depend on the specific polymer and solvent that are used during the preparation. A vacuum oven may be used for solvent removal and curing.

An embodiment cured composite fiber can be evaluated in tension to obtain the strength, the dependency of the strength on the length (i.e. size effect), the Young's modulus, the ductility, and other properties. The fracture surface of the composite fiber may be examined using Scanning Electron Microscopy (SEM) to investigate the failure mode in order to evaluate the strength of the CNT/polymer interface. Transmission electron microscopy (TEM) may be used to examine individual CNT arrangements in the composite fiber and the CNT/matrix interface.

In summary, catalyst structures having trenches, channels, or combinations of channels and structures may be used for preparing arrays of carbon nanotubes. A system for heating a catalyst structure while cooling a volume above the catalyst structure and sending carbon-containing precursor to the catalyst structure provides an array of carbon nanotubes while minimizing the formation of amorphous carbon. An array prepared this way may be used for fiber spinning.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing an array of carbon nanotubes, comprising:
   providing a catalyst structure comprising a discrete substrate having a first side and a second side, a buffer layer on the first side of said substrate, and a catalyst on said buffer layer;
   heating a region of said second side of said catalyst structure;
   cooling a volume above said region and above the first side of the catalyst structure while heating the region of the second side of the catalyst structure, and
   during the cooling, contacting the heated catalyst structure with a carbon nanotube precursor so as to give rise to a plurality of nanotubes atop the catalyst structures;
   wherein the formation of amorphous carbon in the formed array of carbon nanotubes is minimized.

2. The method of claim 1, wherein the catalyst structure comprises a substrate having a first side and a second side, a buffer layer on the first side of the substrate, and a catalyst on the buffer layer.

3. The method of claim 2, wherein said catalyst structure further comprises trenches in the first side of the catalyst structure.

4. The method of claim 2, wherein said trenches extend through the buffer layer and into the substrate of the catalyst structure.

5. The method of claim 2, wherein said catalyst structure further comprises channels through said catalyst structure that allow a carbon source to enter the substrate at the second side and flow through the catalyst structure to the catalyst on the buffer layer.

6. The method of claim 2, wherein said catalyst structure comprises trenches and channels, wherein the trenches are in the first side of the catalyst structure, wherein the channels are through the catalyst structure and allow a carbon source to enter the substrate at the second side and flow through the catalyst structure to the catalyst on the buffer layer.

7. The method of claim 2, wherein at least some of the channels provide fluid communication between the second side of the substrate and at least one trench in the first side of the substrate.

8. The method of claim 2, wherein the substrate comprises silicon, silicon dioxide, glass, metal, or combinations thereof.

9. The method of claim 2, wherein the substrate comprises borosilicate, aluminosilicate, or combinations thereof.

10. The method of claim 2, wherein the buffer layer comprises aluminum oxide, magnesium oxide, zinc oxide, silicon carbide, silicon dioxide, silicon nitride, iron aluminate, or combinations thereof.

11. The method of claim 2, wherein the catalyst comprises metal particles chosen from iron, cobalt, nickel, molybdenum, mixtures thereof, or alloys thereof.

12. The method of claim 2, wherein the carbon nanotube precursor is chosen from hydrocarbons, alcohols, ketones, or mixtures thereof.

13. The method of claim 2, wherein carbon nanotube precursor comprises ethanol, ethylene, acetylene, hexane, or mixtures thereof.

14. The method of claim 2, wherein the carbon nanotube precursor comprises inert gas.

15. The method of claim 2, wherein the carbon nanotube precursor further comprises water vapor, hydrogen, oxygen, or combinations thereof.

16. A method for preparing a fiber, comprising:
providing a catalyst structure comprising a discrete substrate having a first side and a second side, a buffer layer on the first side of said substrate, and a catalyst on said buffer layer;
heating a region of said second side of said catalyst structure;
cooling a volume above said region and said first side of the catalyst structure while heating the region of the second side of the catalyst structure,
during cooling, contacting the heated catalyst structure with a carbon nanotube precursor, thereby forming an array of carbon nanotubes, and
spinning a fiber from the array of carbon nanotubes;
wherein the formation of amorphous carbon in the formed array of carbon nanotubes is minimized.

* * * * *